US008523590B2

(12) United States Patent   (10) Patent No.: US 8,523,590 B2
Van Den Berg   (45) Date of Patent: Sep. 3, 2013

(54) CABLE SYSTEM AND METHODS OF ASSEMBLING A CABLE SYSTEM

(75) Inventor: David Charles Van Den Berg, Markleeville, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/194,671

(22) Filed: Jul. 29, 2011

(65) Prior Publication Data

US 2013/0029511 A1 Jan. 31, 2013

(51) Int. Cl.
*H01R 13/62* (2006.01)

(52) U.S. Cl.
USPC .......................................................... 439/312

(58) Field of Classification Search
USPC .................... 439/312, 578–585, 796
See application file for complete search history.

(56) References Cited

U.S. PATENT DOCUMENTS

| 2,182,896 | A | * | 12/1939 | Hixon | 439/864 |
| 2,677,813 | A | * | 5/1954 | Sharp | 439/864 |
| 2,904,619 | A | * | 9/1959 | Forney, Jr. | 174/88 R |
| 3,184,535 | A | * | 5/1965 | Worthington | 174/90 |
| 3,441,659 | A | * | 4/1969 | Laudig et al. | 174/88 C |
| 3,828,305 | A | * | 8/1974 | Hogendobler | 439/585 |
| 4,156,554 | A | | 5/1979 | Aujla | |
| 4,440,469 | A | * | 4/1984 | Schumacher | 385/81 |
| 4,501,927 | A | | 2/1985 | Sievert | |
| 5,013,122 | A | * | 5/1991 | Savitsky et al. | 385/81 |
| 5,217,392 | A | * | 6/1993 | Hosler, Sr. | 439/585 |
| 5,269,701 | A | | 12/1993 | Leibfried, Jr. | |
| 5,317,664 | A | | 5/1994 | Grabiec et al. | |
| 5,490,801 | A | | 2/1996 | Fisher, Jr. et al. | |
| 5,854,444 | A | * | 12/1998 | Fehlhaber | 174/84 R |
| 5,888,095 | A | * | 3/1999 | Hussaini | 439/584 |
| 6,168,455 | B1 | * | 1/2001 | Hussaini | 439/394 |
| 6,517,253 | B1 | | 2/2003 | Graesser | |
| 7,291,043 | B2 | * | 11/2007 | Morikawa | 439/585 |
| 2004/0033711 | A1 | | 2/2004 | Loveless et al. | |

* cited by examiner

*Primary Examiner* — Briggitte R Hammond
*Assistant Examiner* — Vladimir Imas
(74) *Attorney, Agent, or Firm* — Fletcher Yoder P.C.

(57) ABSTRACT

A cable includes at least one conductor to transmit electrical signals and a shield layer positioned about the at least one conductor. The shield layer shields an environment external to the cable from electromagnetic radiation generated by the electrical signals. The cable also includes a first retention sleeve positioned about the shield layer and a second retention sleeve coupled with the first retention sleeve and to the shield layer.

20 Claims, 6 Drawing Sheets

CABLE SYSTEM AND METHODS OF ASSEMBLING A CABLE SYSTEM

BACKGROUND OF THE INVENTION

The present application relates generally to cable systems and, more particularly, to a cable system and methods of assembling a cable system.

Known data and power cables include at least one conductor and one or more insulative or other layers enclosing the conductor. In at least some known cables, an outermost layer of the cable includes a flexible insulative material to protect and/or insulate the conductor from damage and/or from electrical contact with external objects.

Generally, a connector is coupled to at least one end of the cable for interfacing with an electrical device. At least some known connectors are coupled to the cable via screws, clamps, and/or other coupling mechanisms. Such coupling devices are generally fastened over the outermost insulative layer of the cable. Over time, compressive forces generated by the coupling mechanisms may cause the insulative layer and/or other layers of the cable to be damaged and/or displaced away from the coupling mechanisms. Accordingly, the coupling devices may undesirably become loosened from the cable. Moreover, such known coupling mechanisms may rotate about the cable, and/or may be axially displaced with respect to the cable, in response to torsional and/or tensile forces applied against the cable, the connector, and/or the coupling mechanisms. Over time, such torsional and/or tensile forces may cause the coupling mechanisms and/or the connector to become undesirably loosened and/or become detached from the cable.

BRIEF DESCRIPTION OF THE INVENTION

In one embodiment, a cable is provided that includes at least one conductor to transmit electrical signals and a shield layer positioned about the at least one conductor. The shield layer shields an environment external to the cable from electromagnetic radiation generated by the electrical signals. The cable also includes a first retention sleeve positioned about the shield layer and a second retention sleeve coupled with the first retention sleeve and to the shield layer.

In another embodiment, a cable system is provided that includes at least one conductor to transmit electrical signals and a shield layer positioned about the at least one conductor. The shield shields an environment external to the cable system from electromagnetic radiation generated by the electrical signals. The cable system also includes a connector assembly including a connector configured to couple to an electrical device, a first retention sleeve positioned about the shield layer, and a second retention sleeve coupled with the first retention sleeve and to the shield layer.

In yet another embodiment, a method of assembling a cable system is provided. The method includes providing a cable including a conductor and a shield layer positioned about the conductor, inserting a first retention sleeve over the shield layer, folding a portion of the shield layer over the first retention sleeve, and securing the portion of the shield layer to the first retention sleeve.

DETAILED DESCRIPTION OF THE INVENTION

Figure 1:
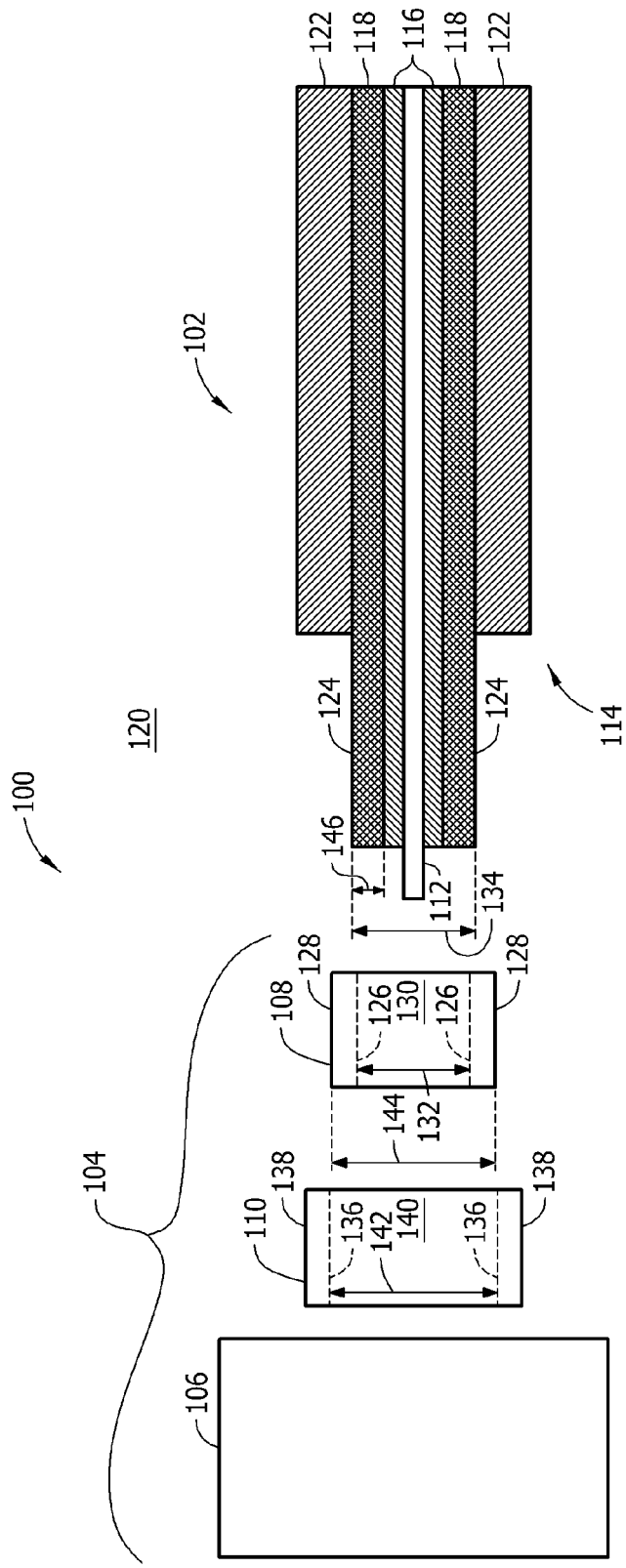
FIG. 1 is a cross-sectional view of an exemplary cable system that may be used with an electrical device.

FIG. 1 is a cross-sectional view of an exemplary cable system 100 that may be used with an electrical device (not shown). In the exemplary embodiment, cable system 100 includes a cable 102 and a connector assembly 104 that includes a connector 106, a first retention sleeve 108, and a second retention sleeve 110.

In the exemplary embodiment, cable 102 includes at least one conductor 112 that transmits electrical signals to, and from, the electrical device. More specifically, in the exemplary embodiment, cable 102 includes two conductors 112. Alternatively, cable 102 may include any number of conductors 112 that enables cable 102 to function as described herein. In the exemplary embodiment, conductor 112 is a metal wire, such as a copper wire. Alternatively, conductor 112 is manufactured from any other material and/or is any other conductor that enables cable system 100 to function as described herein.

Cable 102, in the exemplary embodiment, includes a plurality of concentric layers 114 that substantially enclose conductor 112. Each layer 114, in the exemplary embodiment, is substantially annular. More specifically, in the exemplary embodiment, a first insulative layer 116 is coupled to, and substantially encloses, conductor 112. First insulative layer 116, in the exemplary embodiment, is manufactured from a thermoplastic material, a rubber-based material, and/or any other material that electrically insulates conductor 112.

In the exemplary embodiment, a shield layer 118 is coupled to, and substantially encloses, first insulative layer 116. Shield layer 118, in the exemplary embodiment, is manufactured from an electrically conductive material that may include, but is not limited to only including, copper and/or any other metal and/or metal alloy. Shield layer 118 facilitates electromagnetically shielding an environment 120 external to cable 102 from electromagnetic radiation generated by electrical signals transmitted through conductor 112. Moreover, as shield layer 118 is manufactured from a metal and/or a metal alloy, shield layer 118 is less ductile (i.e. less prone to deformation when subjected to tensile forces) than other layers 114 of cable 102, such as first insulative layer 116.

A second insulative layer 122, in the exemplary embodiment, is coupled to, and substantially encloses, shield layer 118. Second insulative layer 122, in the exemplary embodiment, is manufactured from a thermoplastic material, a rubber-based material, and/or any other material that electrically insulates shield layer 118. Additionally or alternatively, any other layer 114 or layers 114 may be coupled to, and/or enclose, shield layer 118 to enable cable 102 to function as described herein.

In the exemplary embodiment, first retention sleeve 108 is coupled to an outer surface 124 of shield layer 118. More specifically, in the exemplary embodiment, first retention sleeve 108 includes a substantially annular inner surface 126 and an opposing substantially annular outer surface 128. Inner surface 126 defines a substantially annular opening 130 that is sized and shaped to receive shield layer 118 and layers 114 and/or portions of cable 102 enclosed by shield layer 118, such as first insulative layer 116 and conductor 112. Accordingly, a diameter 132 of opening 130 is substantially equal to, or slightly greater than, a diameter 134 of shield layer 118. Alternatively, first retention sleeve 108 has any other size and/or shape that enables cable system 100 to function as described herein.

Moreover, in the exemplary embodiment, second retention sleeve 110 includes a substantially annular inner surface 136 and an opposing substantially annular outer surface 138. Inner surface 136 defines a substantially annular opening 140 that is sized and shaped to receive first retention sleeve 108. In the exemplary embodiment, opening 140 is also sized and shaped to receive a portion (not shown in FIG. 1) of shield layer 118 when shield layer 118 is folded over outer surface 128 of first retention sleeve 108, as described more fully below. Accordingly, a diameter 142 of opening 140 is substantially equal to, or slightly greater than, a diameter 144 of first retention sleeve 108 plus two times a thickness 146 of shield layer 118. Alternatively, second retention sleeve 110 has any other size and/or shape that enables cable system 100 to function as described herein.

Connector assembly 104 and connector 106, in the exemplary embodiment, are at least partially manufactured from a metal and/or a metal alloy. Connector 106 and connector assembly 104 are described more fully below.

Figure 2:
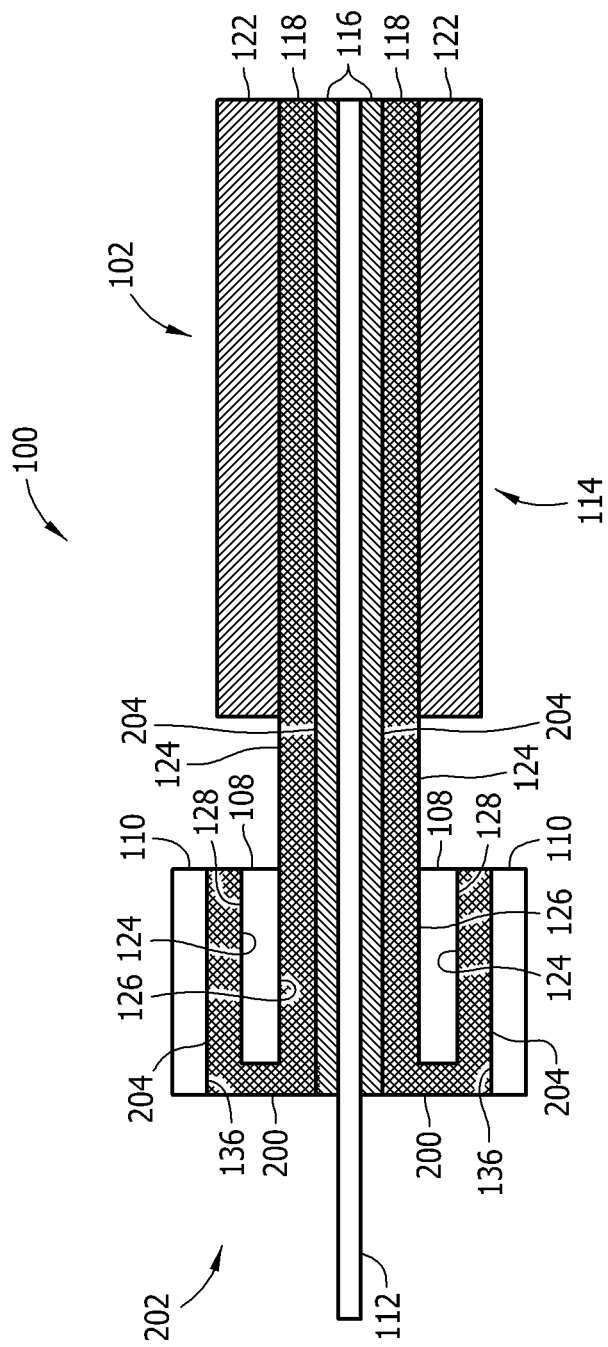
FIG. 2 is a cross-sectional view of the cable system shown in FIG. 1 in a partially assembled state.

FIG. 2 is a cross-sectional view of cable system 100 in a partially assembled state. In the exemplary embodiment, first retention sleeve 108 is inserted over shield layer 118 such that inner surface 126 of first retention sleeve 108 is positioned against outer surface 124 of shield layer 118. A substantially annular portion 200 of shield layer 118 proximate to a downstream end 202 of cable 102 is wrapped or folded over first retention sleeve 108 such that outer surface 124 of shield layer 118 (i.e., of folded portion 200) is positioned against outer surface 128 of first retention sleeve 108. Second retention sleeve 110 is inserted over first retention sleeve 108 and folded portion 200 of shield layer 118 such that inner surface 136 of second retention sleeve 110 is positioned against an inner surface 204 of shield layer 118 that is opposite of outer surface 124. Accordingly, folded portion 200 of shield layer 118 is positioned, and fixedly coupled, between second retention sleeve 110 and first retention sleeve 108.

Figure 3:
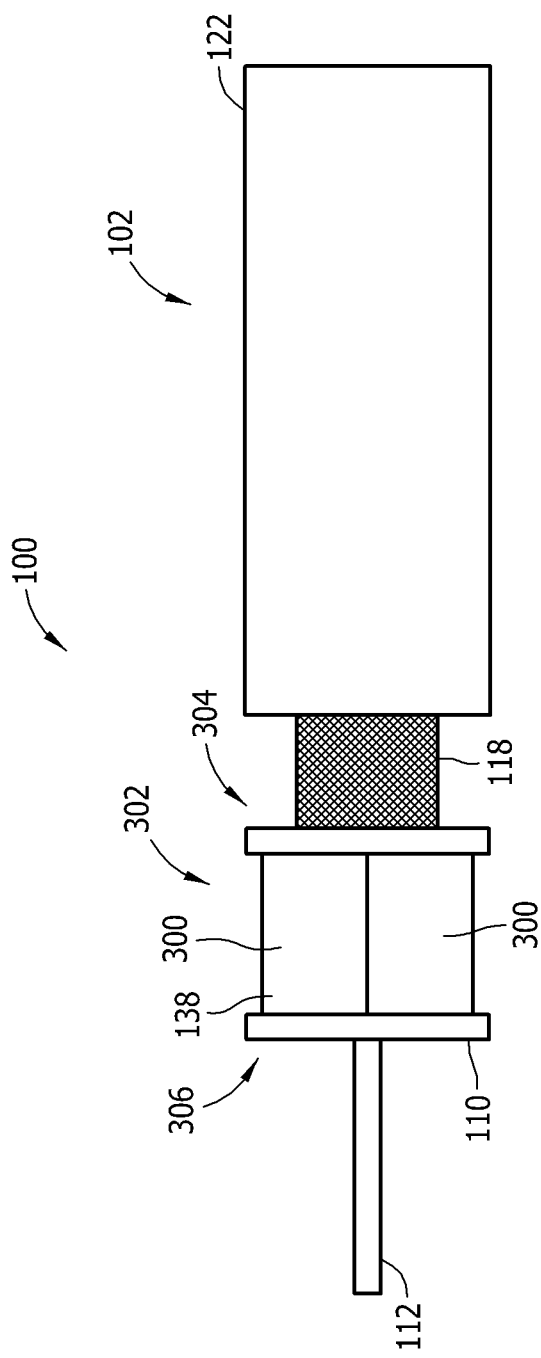
FIG. 3 is a side view of the cable system shown in FIG. 1 in a further partially assembled state.

FIG. 3 is a side view of cable system 100 in a further partially assembled state. After second retention sleeve 110 is inserted over shield layer 118 and first retention sleeve 108, as described above with reference to FIG. 2, second retention sleeve 110 is coupled with first retention sleeve 108 such that shield layer 118 is fixedly coupled, or secured, between first retention sleeve 108 and second retention sleeve 110. In the exemplary embodiment, second retention sleeve 110 is secured to, or clamped onto, first retention sleeve 108 and shield layer 118 by a suitable tool or machine, such as crimping pliers or a crimping machine, that molds first retention sleeve 108 and/or second retention sleeve 110 to conform to a substantially hexagonal cross-sectional shape. Accordingly, a plurality of substantially flat or planar surfaces 300, such as six flat surfaces 300, are formed on outer surface 138 of second retention sleeve 110 and/or on outer surface 128 of first retention sleeve 108.

More specifically, in the exemplary embodiment, a middle portion 302 of second retention sleeve 110 and/or first retention sleeve 108 is clamped or crimped into a substantially hexagonal cross-sectional shape. However, in the exemplary embodiment, an upstream end 304 and a downstream end 306 of second retention sleeve 110 and/or first retention sleeve 108 are not clamped or crimped. Accordingly, upstream end 304 and downstream end 306 retain a substantially annular cross-sectional shape, and middle portion 302 is conformed to a substantially hexagonal cross-sectional shape. In an alternative embodiment, middle portion 302 is clamped or crimped into a substantially square shape, a substantially octagonal shape, or into any other shape that includes a plurality of flat or planar surfaces 300. Alternatively, upstream end 304, downstream end 306, and/or middle portion 302 may have any other cross-sectional shape that enables cable system 100 to function as described herein.

In the exemplary embodiment, shield layer 118 is maintained in frictional, compressional, and electrical contact with first retention sleeve 108 and second retention sleeve 110 when sleeves 108 and 110 are clamped or crimped together. Accordingly, torsional and/or tensile forces that may be applied to cable 102, first retention sleeve 108, and/or second retention sleeve 110 are inhibited from displacing sleeves 108 and 110 with respect to cable 102, and/or are inhibited from causing first retention sleeve 108 and/or second retention sleeve 110 from being decoupled from cable 102.

Figure 4:
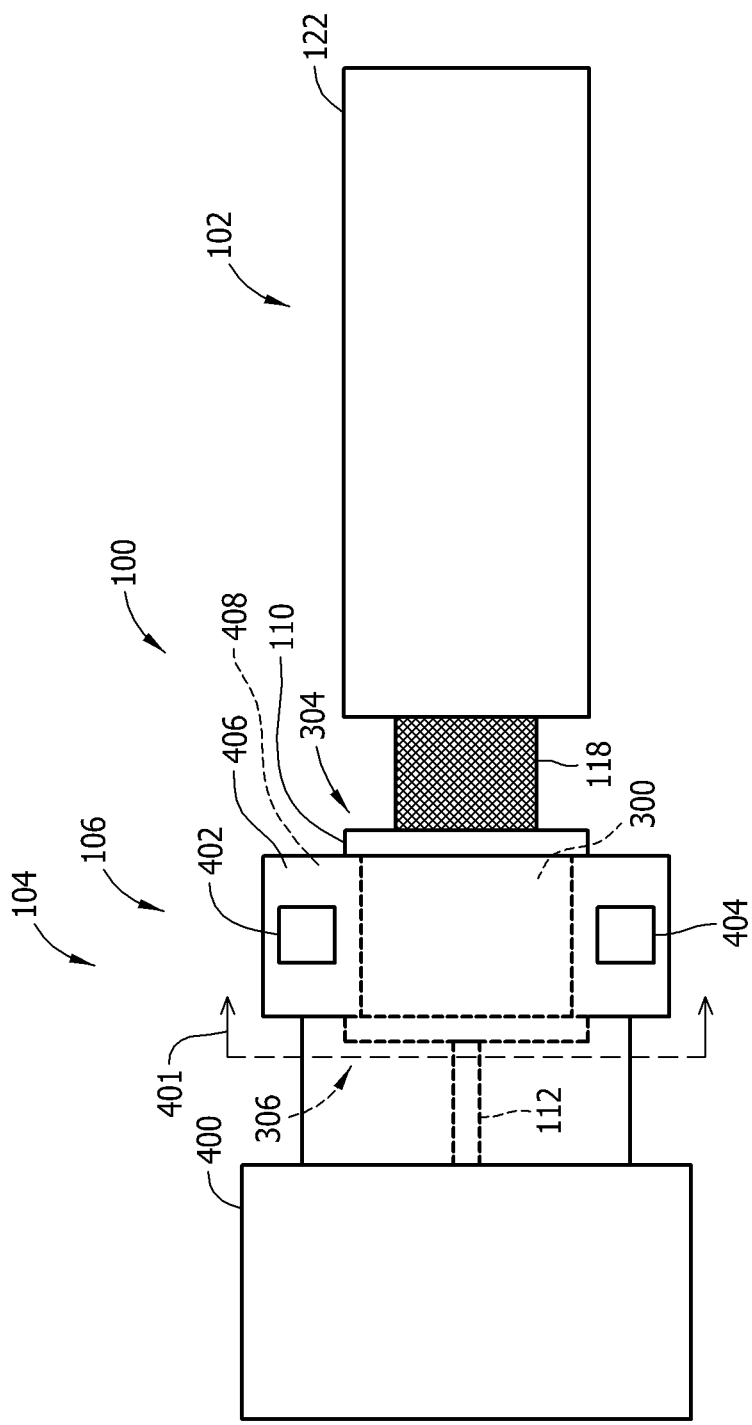
FIG. 4 is a top view of the cable system shown in FIG. 1 in a fully assembled state.
Figure 5:
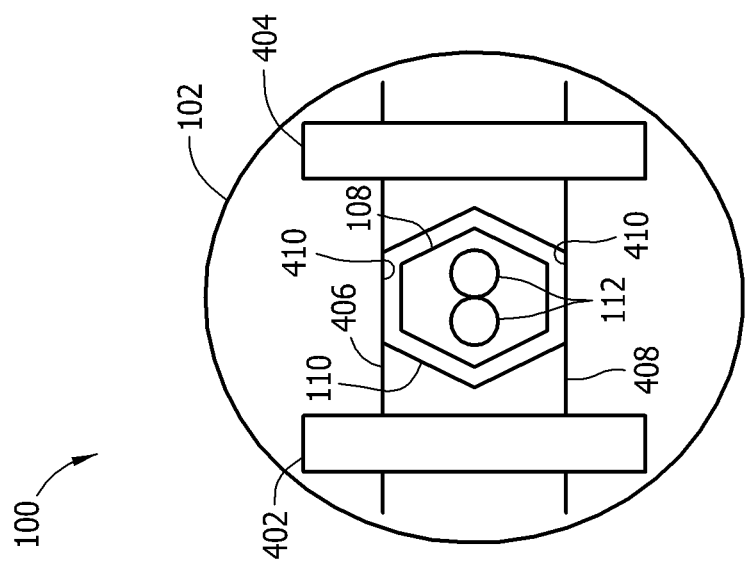
FIG. 5 is a partial front view of the cable system shown in FIG. 1.

FIG. 4 is a top view of an exemplary cable system 100 in a fully assembled state. FIG. 5 is a partial front view of cable system 100 taken along line 401. In the exemplary embodiment, connector assembly 104 is coupled to cable 102 and to a connector or terminal (not shown) of an electrical device (not shown), such as a sensor. In the exemplary embodiment, connector assembly 104 includes first retention sleeve 108, second retention sleeve 110, and connector 106. Moreover, in the exemplary embodiment, connector 106 includes a head portion 400 (not shown in FIG. 5), a first coupling device 402, a second coupling device 404, a first retention member 406, and a second retention member 408.

In the exemplary embodiment, head portion 400 is adapted to be coupled to the terminal or connector of the electrical device. Head portion 400 may be a bayonet Neill-Concelman (BNC) connector, a Concelman (C) connector, or any other connector that enables cable system 100 to electrically couple to the electrical device.

First and second retention members 406 and 408, in the exemplary embodiment, are retention plates 406 and 408 that each include at least one flat or planar portion 410 for use in retaining first and/or second retention sleeve 108 and/or 110. More specifically, when cable system 100 is assembled, flat portion 410 of first retention member 406 is positioned against flat surface 300 of second retention sleeve 110. Flat portion 410 of second retention member 408 is positioned against flat surface 300 of second retention sleeve 110 substantially opposite to first retention member 406. Moreover, in the exemplary embodiment, first and second retention members 406 and 408 are manufactured from an electrically conductive material, such as a metal and/or a metal alloy. As such, when cable system 100 is assembled, first and second retention sleeves 108 and 110 are maintained in electrical contact with connector 106 via first and second retention members 406 and 408. Alternatively, first and/or second retention member 406 and/or 408 may be any other device that includes at least one flat or planar portion 410 for use in retaining first and second retention sleeves 108 and 110.

Moreover, in the exemplary embodiment, first and second retention members 406 and 408 are integrally formed with, and/or are coupled to, head portion 400 such that head portion 400 and members 406 and 408 are electrically coupled together. First and second retention members 406 and 408 enable head portion 400 to be coupled to cable 102 via first and second retention sleeves 108 and 110. Accordingly, in the exemplary embodiment, first and second retention members 406 and 408 facilitate securing first and second retention sleeves 108 and 110 with respect to head portion 400 such that sleeves 108 and 110 do not slip or rotate with respect to head portion 400 and/or retention members 406 and/or 408 when cable 102 or connector 106 is rotated or subjected to torsional forces.

In the exemplary embodiment, first and second coupling devices 402 and 404 couple first and second retention members 406 and 408 together. In the exemplary embodiment, first and second coupling devices 402 and 404 each include at least one nut and at least one screw (not shown). Alternatively, first and/or second coupling device 404 may include at least one pin, bolt, clamp, and/or any other device that couples first and second retention members 406 and 408 together.

During assembly, in the exemplary embodiment, first retention member 406 is positioned against second retention sleeve 110. More specifically, flat portion 410 of first retention member 406 is positioned against flat surface 300 of second retention sleeve 110 between upstream end 304 and downstream end 306 (i.e., against middle portion 302 of second retention sleeve 110). In the exemplary embodiment, second retention member 408 is positioned against second retention sleeve 110 substantially opposite of first retention member 406. More specifically, flat portion 410 of second retention member 408 is positioned against flat surface 300 of second retention sleeve 110 between upstream end 304 and downstream end 306 (i.e., against middle portion 302 of second retention sleeve 110). First and second coupling devices 402 and 404 are inserted through openings (not shown) in first and second retention members 406 and 408. First and second coupling devices 402 and 404 are tightened or fastened to urge first and second retention members 406 and 408 into frictional contact with second retention sleeve 110. Accordingly, in the exemplary embodiment, first and second retention members 406 and 408 are maintained in position against second retention sleeve 110 by upstream end 304 and by downstream end 306 such that members 406 and 408 are substantially inhibited from being displaced in an axial direction with respect to cable 102. Moreover, shield layer 118 is electrically coupled to connector 106 by first retention sleeve 108, second retention sleeve 110, first retention member 406, and second retention member 408 to facilitate providing an uninterrupted grounding path within cable system 100.

Figure 6:
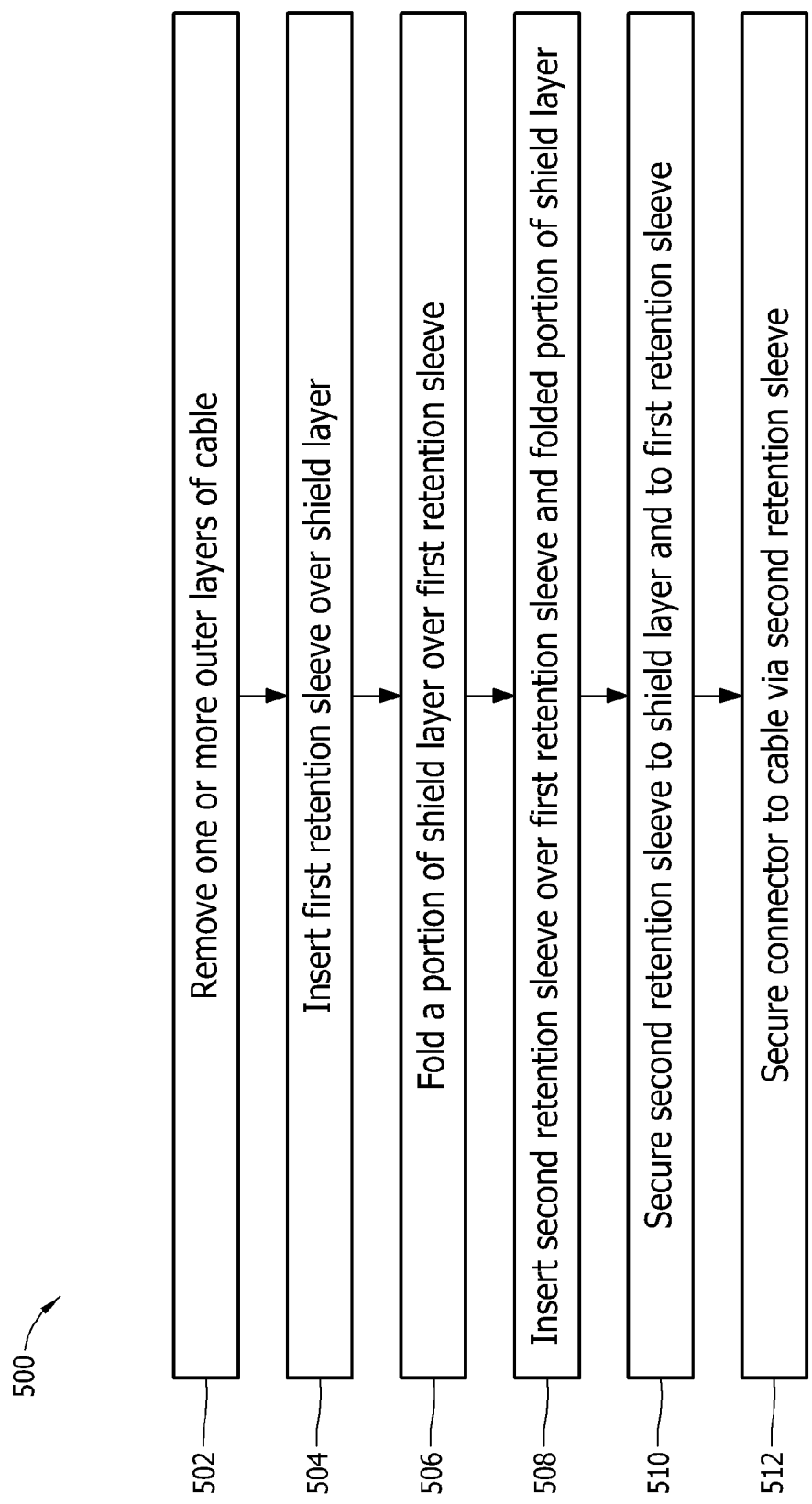
FIG. 6 is a flow diagram of an exemplary method of assembling a cable system that may be used with the cable system shown in FIG. 1.

FIG. 6 is a flow diagram of an exemplary method 500 of assembling a cable system, such as cable system 100 (shown in FIG. 1). In the exemplary embodiment, cable 102 is provided including a plurality of concentric layers 114 (both shown in FIG. 1). In the exemplary embodiment, cable 102 includes at least one conductor 112, a first insulative layer 116, a shield layer 118, and one or more outer layers 114 enclosing shield layer 118 (all shown in FIG. 1).

One or more outer layers 114 of cable 102 are removed 502 to expose shield layer 118 (shown in FIG. 1). First retention sleeve 108 (shown in FIG. 1) is inserted 504 over shield layer 118 such that cable 102, including shield layer 118, extends through opening 130 (shown in FIG. 1) of first retention sleeve 108, and such that outer surface 124 of shield layer 118 is positioned against inner surface 126 of first retention sleeve 108. A portion 200 (shown in FIG. 2) of shield layer 118 is folded 506 over first retention sleeve 108 such that outer surface 124 of shield layer 118 (i.e., outer surface 124 of folded portion 200) is positioned against outer surface 128 of first retention sleeve 108.

In the exemplary embodiment, second retention sleeve 110 (shown in FIG. 1) is inserted 508 over first retention sleeve 108 and folded portion 200 of shield layer 118. Second retention sleeve 110 is secured 510 to shield layer 118 (i.e., to folded portion 200) and to first retention sleeve 108, for example, by crimping or by clamping second retention sleeve 110 and first retention sleeve 108 together. Alternatively or additionally, second retention sleeve 110 and first retention sleeve 108 may be secured 510 to shield layer 118 by soldering, brazing, welding, applying an adhesive material, and/or any other process or material.

Connector 106 (shown in FIG. 1) is secured 512 to cable 102 via second retention sleeve 110. More specifically, first retention member 406 and second retention member 408 are coupled to flat surfaces 300 of second retention sleeve 110. First coupling device 402 and second coupling device 404 are inserted through openings defined in first retention member 406 and second retention member 408, and devices 402 and 404 are fastened or tightened to secure members 406 and 408 to second retention sleeve 110. Connector 106 may be coupled to a connector or terminal of an electrical device to enable electrical signals to be transmitted to, or received from, the electrical device through cable 102.

In contrast to known cable systems and methods of assembling cable systems, the embodiments described herein provide a direct physical and electrical connection between a shield layer of a cable and a connector. As first and second retention sleeves 108 and 110 are coupled directly to shield layer 118, cable 102 is enabled to be securely coupled to connector 106. Because shield layer 118 is manufactured from a metal or metal alloy, shield layer 118, first retention sleeve 108, and second retention sleeve 110 are resistant to deformation caused by tensile forces that may be applied to cable 102 and/or to connector assembly 104. Moreover, as first retention member 406 and second retention member 408 each include at least one flat portion 410 that engages with flat surfaces 300 of second retention sleeve 110, cable 102 and/or connector assembly 104 are resistant to torsional forces that may be applied to cable 102 and/or to connector assembly 104. Additionally, first retention sleeve 108 and second retention sleeve 110 are directly coupled to shield layer 118, to first retention member 406, and to second retention member 408 to provide an uninterrupted grounding path to facilitate electromagnetically shielding external environment 120 from electromagnetic radiation generated by signals transmitted through cable 102.

Exemplary embodiments of a cable system and methods of assembling a cable system are described above in detail. The methods and system are not limited to the specific embodiments described herein, but rather, components of the system and/or steps of the methods may be utilized independently and separately from other components and/or steps described herein. For example, the cable system may also be used in combination with other power systems and methods, and are not limited to practice with only the electrical device as described herein. Rather, the exemplary embodiment can be implemented and utilized in connection with many other data or power applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cable comprising:
   at least one conductor to transmit electrical signals;
   a shield layer positioned about the at least one conductor to shield an environment external to the cable from electromagnetic radiation generated by the electrical signals;
   a first retention sleeve positioned about the shield layer; and
   a second retention sleeve coupled with the first retention sleeve and to the shield layer, wherein the second retention sleeve is configured to couple to at least one retention member of a connector, the second retention sleeve includes a middle portion extending axially between a pair of opposed outer surface, and the opposed outer surface are configured to engage opposite axial ends of the at least one retention member to block axial movement of the connector relative to the second retention sleeve.

2. The cable in accordance with claim 1, wherein the second retention sleeve is positioned about the first retention sleeve.

3. The cable in accordance with claim 1, wherein a portion of the shield layer is fixedly coupled between the first retention sleeve and the second retention sleeve.

4. The cable in accordance with claim 1, wherein the first retention sleeve comprises an outer surface and an opposing inner surface, the shield layer comprises an outer surface and an opposing inner surface, and wherein the outer surface of the shield layer is positioned against the inner surface of the first retention sleeve.

5. The cable in accordance with claim 1, wherein the at least one retention member comprises two or more retention members coupled to one another by at least one coupling device.

6. The cable in accordance with claim 1, wherein the middle portion comprises a plurality of flat surfaces configured to engage a corresponding plurality of planar portions of the at least one retention member to block rotation of the connector relative to the second retention sleeve.

7. The cable in accordance with claim 4, wherein a portion of the shield layer is folded over the first retention sleeve such that the outer surface of the shield layer is positioned against the outer surface of the first retention sleeve.

8. The cable in accordance with claim 7, wherein the second retention sleeve comprises an outer surface and an opposing inner surface, the outer surface of the first retention sleeve and the inner surface of the shield layer are positioned against the inner surface of the second retention sleeve.

9. A cable system comprising:
   at least one conductor to transmit electrical signals;
   a shield layer positioned about the at least one conductor to shield an environment external to the cable system from electromagnetic radiation generated by the electrical signals; and
   a connector assembly comprising:
      a connector configured to couple to an electrical device, wherein the connector comprises at least one retention member;
      a first retention sleeve positioned about the shield layer; and
      a second retention sleeve coupled with the first retention sleeve and to the shield layer, the second retention sleeve includes a middle portion extending axially between a pair of opposed outer surface, the middle portion comprises a plurality of flat surfaces configured to engage a corresponding plurality of planar portions of the at least one retention member to block rotation of the connector relative to the second retention sleeve, and the opposed outer surface are configured to engage opposite axial ends of the at least one retention member to block axial movement of the connector relative to the second retention sleeve.

10. The cable system in accordance with claim 9, wherein the second retention sleeve is positioned about the first retention sleeve.

11. The cable system in accordance with claim 9, wherein a portion of the shield layer is fixedly coupled between the first retention sleeve and the second retention sleeve.

12. The cable system in accordance with claim 9, wherein the first retention sleeve comprises an outer surface and an opposing inner surface, the shield layer comprises an outer surface and an opposing inner surface, and wherein the outer surface of the shield layer is positioned against the inner surface of the first retention sleeve.

13. The cable system in accordance with claim 9, wherein the at least one retention member comprises two or more retention members coupled to one another by at least one coupling device.

14. The cable system in accordance with claim 12, wherein a portion of the shield layer is folded over the first retention sleeve such that the outer surface of the shield layer is positioned against the outer surface of the first retention sleeve.

15. The cable system in accordance with claim 14, wherein the second retention sleeve comprises an outer surface and an opposing inner surface, the outer surface of the first retention sleeve and the inner surface of the shield layer are positioned against the inner surface of the second retention sleeve.

16. A method of assembling a cable system, comprising:
   providing a cable including a conductor and a shield layer positioned about the conductor;
   inserting a first retention sleeve over the shield layer;
   folding a portion of the shield layer over the first retention sleeve;
   inserting a second retention sleeve about the first retention sleeve and about the folded portion of the shield layer, wherein the second retention sleeve includes a middle portion extending axially between a pair of opposed outer surface; and
   securing at least one retention member of a connector to the second retention sleeve such that contact between the opposed outer surface of the second retention sleeve and opposite axial ends of the at least one retention member blocks axial movement of the connector relative to the second retention sleeve.

17. The method in accordance with claim 16, comprising at least one of clamping and crimping the first retention sleeve and the second retention sleeve together.

18. The method in accordance with claim 16, wherein the at least one retention member comprises two or more retention members, and securing the at least one retention member to the second retention sleeve comprises coupling the two or more retention members to one another using at least one coupling device.

19. The method in accordance with claim 16, wherein securing the at least one retention member to the second retention sleeve comprises engaging a plurality of flat surfaces of the middle portion with a corresponding plurality of planar portions of the at least one retention member to block rotation of the connector relative to the second retention sleeve.

20. The method in accordance with claim 17, wherein the folded portion of the shield layer is at least one of clamped and crimped between the first retention sleeve and the second retention sleeve.

* * * * *